| United States Patent [19] | [11] Patent Number: 4,601,204 |
| Fournot et al. | [45] Date of Patent: Jul. 22, 1986 |

[54] APPARATUS WITH MEANS OF SELF-DISPLACEMENT FOR ITS ADVANCE WITHIN A DUCT, IN PARTICULAR FOR REMOTE INSPECTION AND/OR TREATMENT AND/OR TUBING OF SAID DUCT

[75] Inventors: Bernard Fournot, Elbeuf; François Le Bozec, Le Mesnil Esnard; Daniel Rouland, 11-13 rue des Capucins, 76000 Rouen, all of France

[73] Assignees: Daniel Rouland; Gaz de France, both of France

[21] Appl. No.: 652,605

[22] Filed: Sep. 20, 1984

[30] Foreign Application Priority Data

Sep. 23, 1983 [FR] France .................. 83 15163

[51] Int. Cl.⁴ .......................................... G01M 19/00
[52] U.S. Cl. .............................. 73/432 R; 104/138 G;
                                                        104/154
[58] Field of Search ............ 73/432 G, 432 B, 432 R,
    73/623, 40.5 R; 254/134.3 FT, 93 R, 93 HP;
    15/104.3 SN; 104/138 R, 138 G, 287, 295, 296,
    297, 154, 155, 156; 105/365; 33/125 B, 302, 1
           H, 141 G, 529; 378/60; 358/100, 98, 107;
                                                        324/220

[56] References Cited

U.S. PATENT DOCUMENTS

| 1,810,143 | 6/1931 | Okey .................... 15/104.3 SN |
| 3,495,546 | 2/1970 | Brown et al. ................ 73/432 B |
| 3,495,626 | 2/1970 | Nagel ........................... 138/97 |
| 3,718,918 | 3/1973 | Van Koevering et al. ...... 138/97 X |
| 3,971,544 | 7/1976 | Smith, Jr. ............ 254/134.3 FT |
| 4,050,384 | 9/1977 | Chapman ............... 73/40.5 R X |
| 4,131,018 | 12/1978 | Müller et al. ............ 73/432 B |
| 4,170,902 | 10/1979 | Pallan ........................ 73/432 B |
| 4,244,296 | 1/1981 | Vertut ................. 73/40.5 R X |
| 4,272,984 | 6/1981 | Bell ........................ 73/40.5 R |
| 4,372,161 | 2/1983 | de Buda et al. ............ 73/432 G |
| 4,460,920 | 7/1984 | Weber et al. ............... 73/623 X |

FOREIGN PATENT DOCUMENTS

| 0074147 | 3/1983 | European Pat. Off. . |
| 1583501 | 11/1969 | France . |
| 2114111 | 6/1972 | France . |
| 2342455 | 9/1977 | France . |
| 2491785 | 4/1982 | France . |
| 16288 | 2/1977 | Japan .................. 73/40.5 A |
| 1535252 | 12/1978 | United Kingdom .......... 73/432 B |
| 430315 | 5/1975 | U.S.S.R. ................ 73/432 B |
| 550573 | 8/1977 | U.S.S.R. ................ 73/432 B |
| 680094 | 8/1979 | U.S.S.R. ............. 254/134.3 FT |
| 687357 | 9/1979 | U.S.S.R. ................ 73/40.5 R |

Primary Examiner—Stewart J. Levy
Assistant Examiner—Tom Noland
Attorney, Agent, or Firm—Steinberg & Raskin

[57] ABSTRACT

The invention relates to an apparatus with a self-displacing device for its advance in the interior of a duct for remote inspection and/or treatment. The apparatus comprises a plurality of elements coupled to one another so as to make up a train, each element of which constitutes a wagon independent of the other elements and interchangeable at will, each element fulfilling a definite function and being of a length adapted for the curves to be taken, at least one of the elements constituting a displacing element and advantageously another one of the elements constituting an element for operating the displacing element. At least one element is a holding element including a holding device bearing selectively upon the internal wall of the duct, whereas the displacing element preferably is a puller-pusher element. The apparatus is supplied with electric power and with compressed-air through a cable and a compressed-air conduit, respectively. The apparatus has considerable tractive force reaching 3 tons and can cover a distance of 2 kilometers.

27 Claims, 12 Drawing Figures

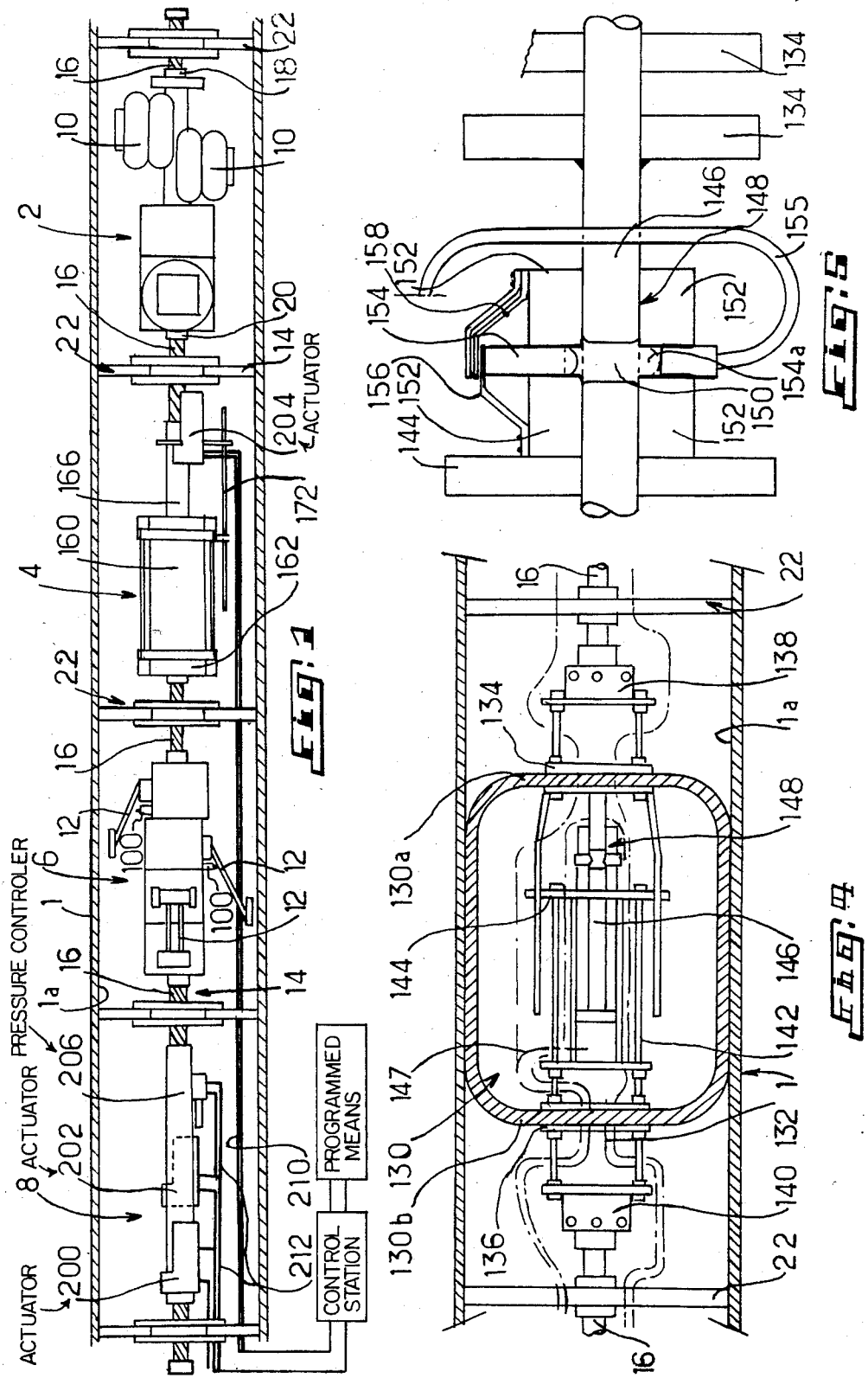

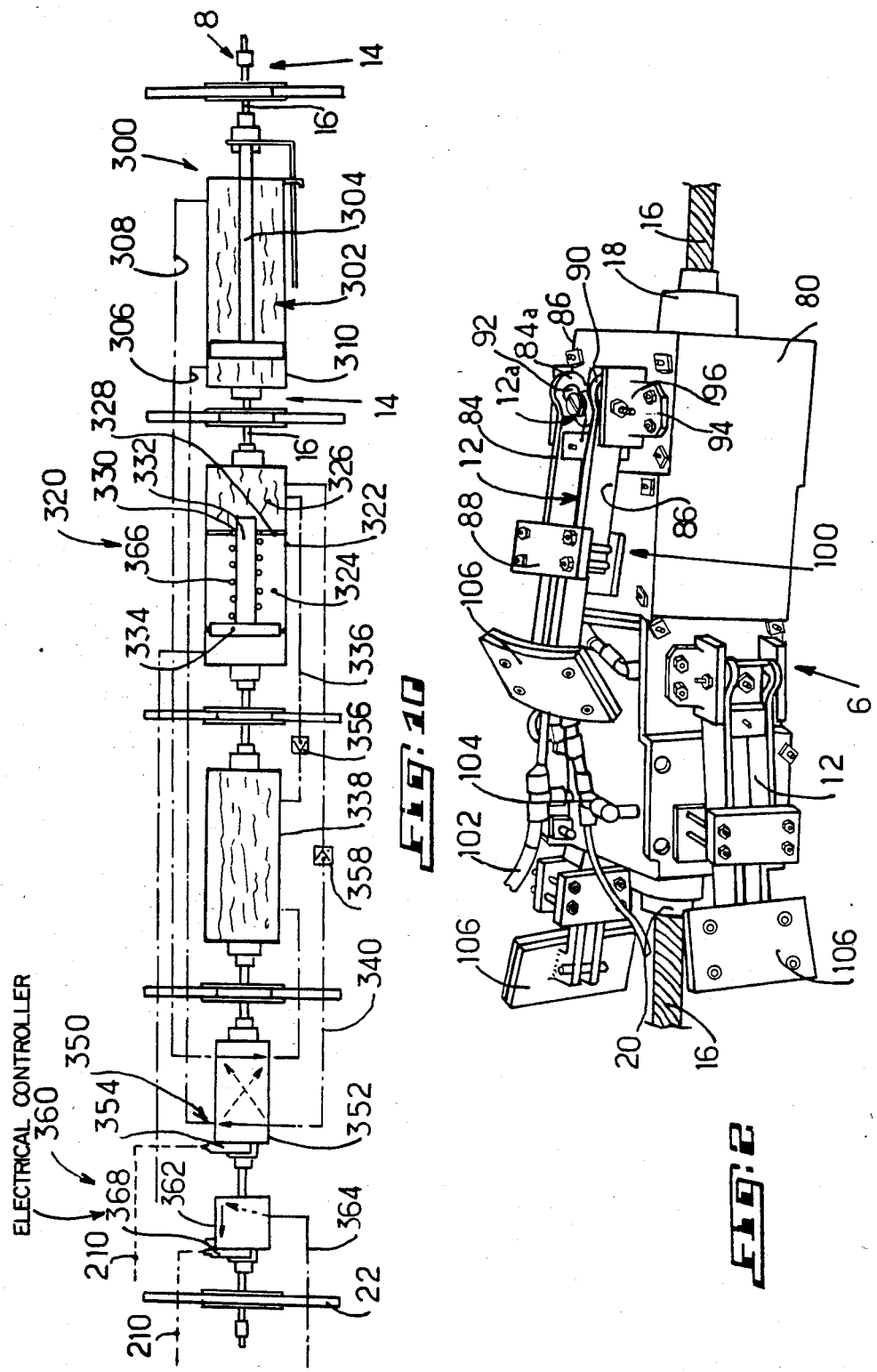

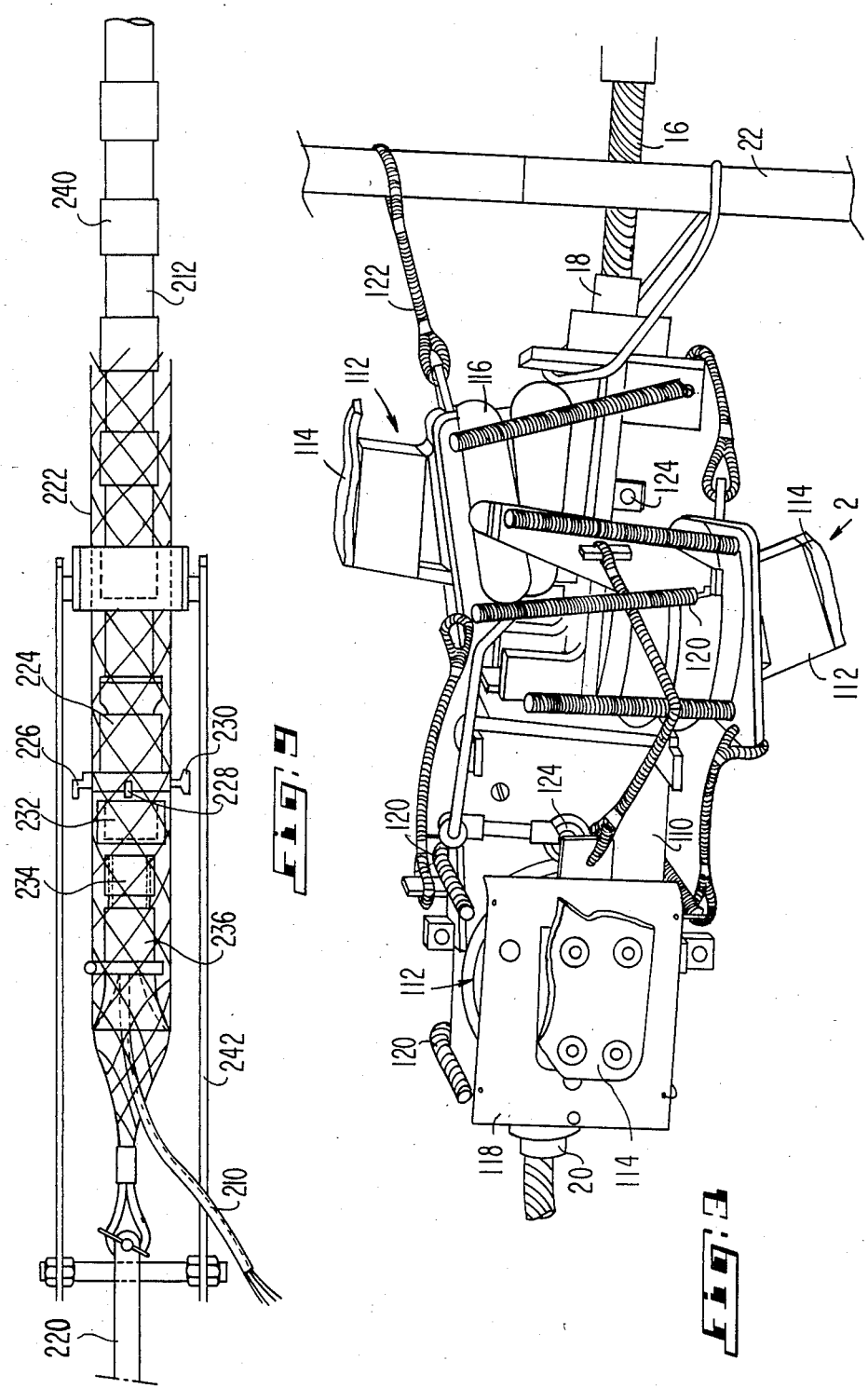

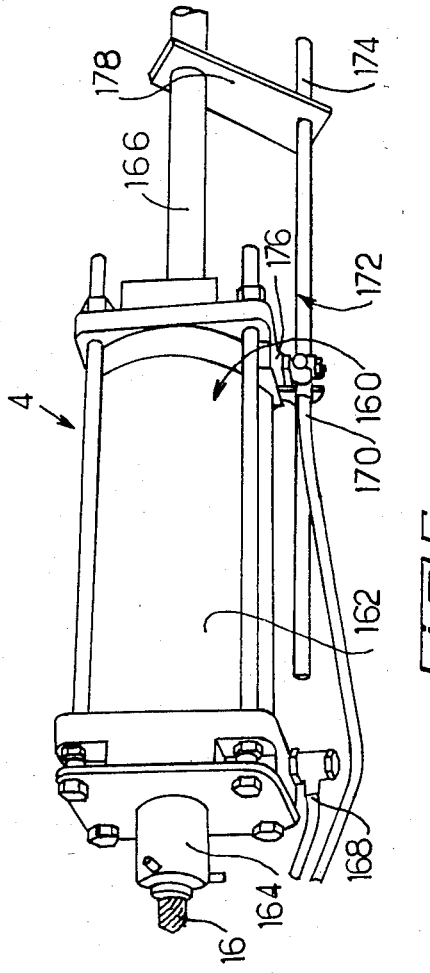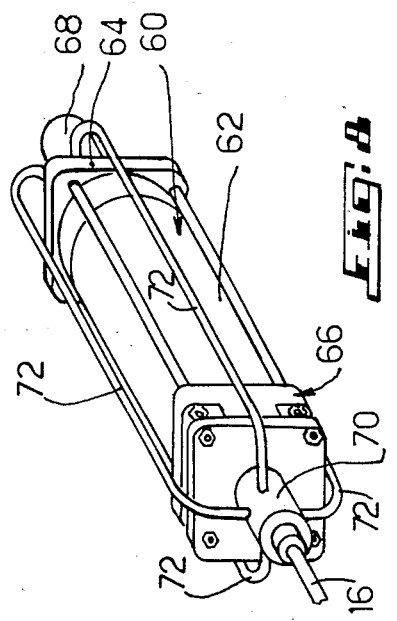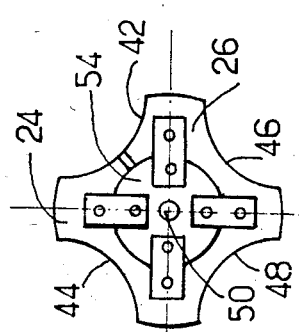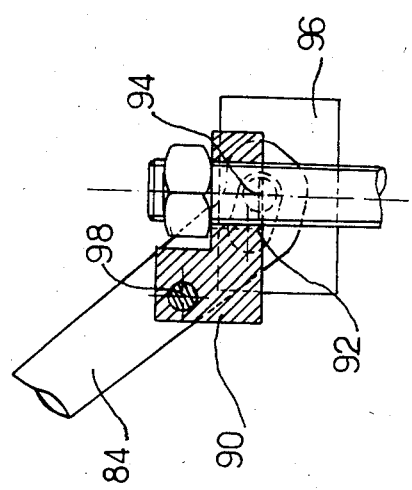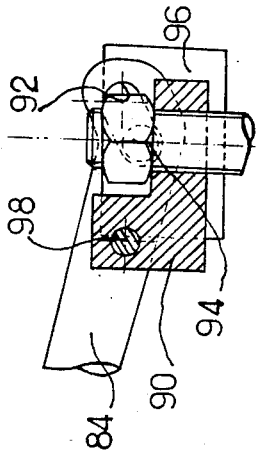

APPARATUS WITH MEANS OF SELF-DISPLACEMENT FOR ITS ADVANCE WITHIN A DUCT, IN PARTICULAR FOR REMOTE INSPECTION AND/OR TREATMENT AND/OR TUBING OF SAID DUCT

BACKGROUND OF THE INVENTION

The present invention relates essentially to an apparatus with means of self-displacement of its advance in the interior of a duct or the like, particularly for remote inspection and/or treatment and/or tubing thereof.

There are already known various self-displacing or self-propelling apparatus for remote internal inspection of ducts and/or treatment thereof.

For example, French Pat. No. 1 583 501 discloses a self-propelling truck capable of drawing a trailer in the interior of a duct with a view to taking X-ray photographs of the circular butt-welds joinint the tubes together. This truck includes a propelling device with driving wheels mounted at the top of a jointed pantograph.

Such a self-propelling truck can be used only in large-diameter ducts for it poorly lends itself to miniaturization. Furthermore, it can generally enter only relatively clean ducts. For example, if the duct wall has various viscous or sticky deposits on it, such as for example tar, such a self-propelling truck, owing to its design, cannot advance in the duct, due particularly to its deficiency in tractive force.

Also, French patent application No. 71 37 060 discloses a compact vehicle for examining transporting and distributing conduits whose advance is ensured by the presence of driving wheels and the design of which is complex in order, particularly, to allow the apparatus to be directed in the interior of the duct. Also this vehicle is limited in tractive force.

Another example of such a type of apparatus is disclosed in French patent application No. 76 05 237 (publication No. 2 342 455), the advance of which is ensured by a wheel and V-belt system. Likewise, this device cannot overcome all the obstacles and is limited in tractive force.

To sum up the foregoing, the prior art in this technical field relates essentially to apparatus with means of self-propulsion or self-displacement for their advance in the interior of ducts, particularly for their remote inspection and/or treatment in case the said ducts are perfectly clean and without solid extraneous matter.

But ducts are often polluted or soiled and contain solid extraneous matter, particularly sticky matter such as for example tar, so that considerable tractive forces are required which the presently known trucks cannot produce. Furthermore, all the apparatus of the prior art are of complex design making any considerable miniaturization thereof practically impossible and thus preventing their use in small-diameter ducts.

SUMMARY OF THE INVENTION

The present invention therefore has as a purpose to provide an apparatus with means of self-displacement for its advance in the interior of a duct, particularly for remote inspection, treatment or tubing thereof, which is very simple in design, has considerable tractive force and can be adapted at will according to the type of duct to be inspected, treated or tubed. Another purpose of the invention is to provide a self-displacing apparatus which is easily miniaturizable so as to be usable not only in large-diameter ducts but also in ducts of small diameter, for example of from 0.20 meter to 0.25 meter, it being understood that smaller diameters can be contemplated without problem.

The present invention therefore provides a self-displacing apparatus allowing the aforementioned purposes as well as all other ones which will be apparent to anybody conversant with the art to be achieved, characterized in that it includes a plurality of elements coupled together so as to make up a train, each element of which constitutes a wagon independent of the other elements and is interchangeable at will, each element performing a definite function and being of a length adapted for any curves to be taken, at least one of the said elements constituting a displacing element, advantageously at least another said element constituting an element for operating the said displacing element.

According to a preferred form of embodiment of the invention, the said displacing element is an element which displaces by pulling or by pushing, referred to as a puller-pusher element.

According to another preferred form of embodiment, at least one element is a holding element including holding means selectively bearing on the internal wall of the duct so as to resist high tractive forces. Preferably, the said puller-pusher element is arranged between and upstream holding element and a downstream holding element alternatively actuated by the said operating element.

According to a specific form of embodiment, the puller-pusher element is constituted by a fluid-operated actuator including a body connected to part of the coupled elements at least one of which is a holding element, and an actuator piston connected to the remaining part of the coupled elements at least one of which is a holding element. The said actuator may be operated either pneumatically or hydraulically, depending on the required tractive force.

Each holding element may be designed in various forms which will be discussed later and each of which forms an integral part of the invention.

Furthermore, and according to still another advantageous features of the invention, the elements are coupled to one another by flexible articulating or linking means consisting for example of cable lengths particularly of steel in twisted strands, each said linking cable being provided with sleeves fitted thereon by swaging or the like and inserted into sockets provided in the lements to be assembled. Advantageously, the apparatus of the invention includes sliding and centering bearing means which are preferably supported by the flexible articulating means.

It is therefore seen from the foregoing that, owing to the design of the apparatus of the invention in the form of a plurality of elements coupled together so as to form a train each element of which constitutes a waggon independent of the other elements and is interchangeable at will, the apparatus of the invention is not compact as in the prior art but extends along the axis of the duct and may therefore be small in spread, i.e. easily miniaturizable, and, consequently, may be used in ducts of small diameters.

furthermore, a considerable advantage of the interchangeability of the elements lies in the fact that when, for example, a greater tractive force is desired, it is sufficient to replace the displacing element with a displacing element providing a greater tractive force.

Furthermore, the articulating or coupling of the elements to one another, according to the invention, by means of flexible articulating elements allows the taking of curves, which is a considerable and particularly unexpected technical advantage of the apparatus of the invention over the prior art.

Thus, the apparatus of the invention is usable in greatly soiled media which may contain solid extraneous matter as well as viscous or sticky deposits, such as for example tar deposits, owing to its great tractive force. Such great tractive force also allows the traction, without any difficulty, of any type of apparatus for inspecting and/or treating ducts, as well as of tubes for tubing the same.

BRIEF DESCRIPTION OF THE DRAWINGS

Other purposes, features and advantages of the invention will appear more clearly as the following explanatory description proceeds with reference to the appended drawings illustrating several presently preferred forms of embodiments of the invention given solely by way of example and which should in no way be considered as limiting the scope of the invention. In the drawings:

FIG. 1 diagrammatically illustrates the essential elements of the self-displacing apparatus of the invention in the interior of a duct;

FIG. 2 is a perspective view of a first form of embodiment of a holding element which, in the case considered here, is the downstream holding element of the apparatus of FIG. 1;

FIG. 3 is a perspective view of a second form of embodiment of a holding element, which, in this case, is the upstream holding element of the apparatus of FIG. 1;

FIG. 4 is a partial sectional view of a third form of embodiment of a holding element according to the invention;

FIG. 5 is a detailed view of the piston of the actuator for stretching the holding element shown in FIG. 4;

FIG. 6 is a perspective view of the puller-pusher element which, in this case, is a fluid-operated actuator;

FIG. 7 is an elevational view of the sliding and centering bearing means shown in FIG. 1;

FIG. 7a is a front view of the bearing and centering means of FIG. 7;

FIG. 8 shows another form of embodiment of the bearing and centering means of the invention;

FIG. 9 is a diagrammatic perspective view illustrating the supply connection of the apparatus of the invention;

FIG. 10 is a diagrammatic view of complementary elements of the self-displacing apparatus of the invention, following the main elements of FIG. 1 and coupled thereto so as to make up an apparatus with a greater tractive force, and FIGS. 11 and 12 are simplified views of the system of articulation of the arms of the holding element shown in FIG. 2, in lowered or folded position (FIG. 11) and in raised or unfolded position (FIG. 12).

DESCRIPTION OF THE PREFERRED EMBODIMENTS

Referring to FIG. 1, an apparatus according to the invention with self-displacement means for its advance in the interior of a duct 1, in particular for its tubing, its remote inspection and/or treatment, is characterized in that it includes a plurality of elements 2, 4, 6, 8, coupled to one another so as to make up a train, each element of which constitutes a wagon independent of the other elements and is interchangeable at will, each element fulfilling a definite function and being of a length adapted for the curves to be taken. At least one of the elements 2, 4, 6, 8, constitutes a displacing element proper (the element 4 in the case considered).

Advantageously, at least another one of the said elements 2, 4, 6, 8 constitutes an element (the element 8 in the case considered) for operating the displacing element 4.

According to one feature of the invention, the displacing element 4 is an element for displacement by pulling or pushing, referred to as a puller-pusher element.

According to another feature of the invention, at least one element (the two elements 2, 6 in the case considered) is a holding element including holding means 10 associated with the element 2 and holding means 12 associated with the element 6, and which selectively bear on the internal wall 1a of the duct 1 so as to resist high tractive efforts.

According to the preferred form of embodiment and as illustrated, the puller-pusher element 4 constituting the displacing element is arranged between an upstream holding element 2 and a downstream holding element 6 alternately actuated by the operating element 8.

According to a particularly advantageous form of embodiment of the invention, the elements 2, 4, 6, 8 are coupled to one another by flexible articulating or linking means consisting for example of cable lengths particularly of steel in twisted strands, and of suitable length. Each said linking cable constituting the articulating means 14 is provided at its ends with sleeves, such as 18, 20, for articulating with one another the elements 2, 4, fitted thereon by swaging or the like and inserted into sockets provided in the elements to be assembled or coupled. The articulating means 14 are shown more clearly in FIG. 7.

According to another advantageous form of embodiment, the apparatus of the invention includes sliding and centering bearing means 22 (one form of embodiment of which is illustrated in FIG. 1 and shown in more detail in FIGS. 7 and 7a). Preferably, the sliding and centering bearing means 22 are supported by the flexible articulating means 14 to allow this sliding and centering bearing function to be fulfilled effectively, the spread or width of the said means 22 being practically equal to or slightly smaller than the diameter of the duct 1 to be inspected and/or treated and/or tubed.

Referring to the form of embodiment illustrated in FIGS. 7 and 7a, the sliding and centering bearing means 22 advantageously include two cup-shaped elements 24, 26, e.g. of elastomer or rubber, each clamped between side-plates 28, 30 and side-plates 32, 34, respectively, the said side-plates advantageously being separable and merely assembled by systems of stud bolts and nuts such as 36, 38, 40. Each cup-shaped element 24, 26 is preferably provided with recesses such as 42, 44; 46, 48, respectively, allowing the passage of unfixed extraneous matter (FIG. 7a).

Furthermore, the said sliding and centering bearing means 22 are supported by the flexible articulating means 14 through the medium of a sleeve 50 press-fitted onto the linking cable 16 between the end sleeves 18 and 20, the said sleeve 50 being inserted into a housing 52 provided in a substantially disc-shaped central member 54 to which are removably attached the lower ends of the side-plates 28, 30, 32, 34 by means of the same system of stud bolts and nuts as for the cup-shaped elements 24, 26, already described.

Another variant of embodiment of the sliding and centering bearing means 22 is illustrated in FIG. 8.

According to this second form of embodiment, the means 22 are constituted by a sledge member 60 which is substantially tubular in shape and includes a tube 62 proper provided at its ends with end-plates 64, 66 provided with sleeves 68, 70 press-fitted onto the linking cable 16. Sliding and centering bands or strips 72 are attached to the sleeves 68, 70 and bear externally on the end-plates 66 or 64. The bands or strips 72 may also be attached directly to the end-plates side facing the linking cable 16 instead of being secured to the sleeves 68, 70. Each end-plate may be made in a single piece or constituted by an assembly of several parts as shown in FIG. 8, and the end-plates may be of various shapes. The width of the sledge member 60 is of course substantially equal to or slightly smaller than the diameter of the duct 1 to be inspected and/or treated.

Referring to FIG. 2, there is shown a first form of embodiment of a holding element, which, in the apparatus shown in FIG. 1, is the downstream holding element but which may also constitute the upstream holding element 2.

According to this first form of embodiment, the holding element 6 includes a casing 80 connected to the linking cable 16 by the same system of sleeves 18, 20 press-fitted onto the linking cable and inserted into corresponding housings provided in the casing 80. In the case considered here, the casing 80 is provided on its periphery with several rigid arms 12, four in number in the case considered, advantageously adjustable in length and of telescopic and independently movable design. The arms 12 are pivotally connected, at one end 12a, to the casing 80, said pivotal connection being shown in FIG. 11 in more detail but in a simplified manner. It can be seen that, in practice, each arm is constituted by two parallel bars 84, 86 connected together by spacers 88, 90. The pivoted end 84a, 86a of each bar is provided with an aperture such as aperture 92 clearly visible in FIGS. 2 and 11 and through which extends a pin 94 mounted on a bearing member 96. The cooperation of the aperture 92 and the pin 94 allows defining the angle of unfolding of the arms 12 and locking the said arms in either unfolded or folded position. Furthermore, the spacer 90 located near the ends 84a, 86a of the bars 84, 86 is provided with a pivot pin proper 98 placed between the arm travel guiding pin 94 and the free end of the arm 12. The unfolding of the arms 12 from their folded position of rest substantially parallel to the casing 80 is obtained, by means of small-travel rigid actuators 100, which preferably are pneumatic actuators, by rotating the arms 12 in a plane perpendicular to the axis of the duct. The compressed-air supply conduits such as 102,104 are clear y seen in FIG. 2. The arms 12 are shifted by 90° with respect to one another so that the holding action is symmetrical.

Lastly, the free end of the arms 12 is provided with holding shoes 106 which preferably are made of elastomer or rubber.

Referring to FIG. 3, there is illustrated a second form of embodiment of a holding element which, in the apparatus of FIG. 1, constitutes for example the upstream holding element 2 but which may as well constitute the downstream holding element.

The holding element 2 also includes a casing or body 110 also connected to the linking cable 16 by sleeves 18, 20 in the same manner as in the other elements as already described. The casing 110 is provided on its periphery with a plurality of flexible actuators 112, generally four in number, shifted from one another by 90°, independent of one another, radially projecting towards the internal wall 1a of the duct and whose free end is also provided with holding means 114 constituted by shoes, preferably of elastomer or rubber.

Preferably, these actuators are pneumatic actuators which, in the form of embodiment illustrated, consist of elongate inflatable bags 116. In this case, in order to keep the upper end or head of the actuator 112 shifted with respect to its base, there are provided shrouds or the like 118 associated with resilient return means 120, e.g. springs, to cause the actuator 112 to sink during deflation, as well as tighteners 122 connected either to the body 110 or to the sliding and centering bearing means 22. In the example illustrated, the compressed-air supply conduits are designated by the reference numeral 124. Use may be made of a fluid other than air.

Referring to FIG. 4, there is shown a third form of embodiment of the holding elements which may constitute the holding element 2 and/or the holding element 6 of the apparatus shown in FIG. 1. According to this form of embodiment, the holding element includes an inflatable balloon member 130, generally of rubber, which, in the non-inflated state, is smaller in outer diameter than the internal diameter of the duct 1, and which, in the inflated state, as shown in FIG. 4, directly engages the internal wall 1a of the duct 1. Preferably, the inflating of the balloon 130 is obtained by injecting compressed air through a supply conduit 132 extending through the sliding and centering bearing means 22, as seen clearly in FIG. 4. Likewise, all the supply conduits extend from one element to the other through the means 22 from the operating element 8 which will be described later.

In this third form of embodiment, the holding element, i.e. the balloon 130, is provided at its front wall 130a and its rear wall 130b with means 134, 136 of connection with the linking cable 16, consisting for example of end-plates which are clearly seen in FIG. 4 on either side of the wall 130a, 130b and connected with sleeves 138, 140 press-fitted onto the linking cable 16.

According to a preferred feature of this third form of embodiment of a holding element, the inflatable balloon 130 contains a rigid fluid-operated actuator 142 for stretching the balloon 130, the body 144 of the said actuator being connected to the front or rear wall (as shown) of the balloon 130 and the piston 146 thereof being connected to the rear or front wall (as shown), respectively, of the balloon 130, so as to axially stretch the balloon and thus reduce its diameter.

Advantageously, this actuator is a pneumatic actuator supplied with compressed air through the conduit 147. To prevent axial deformation of the balloon 130 during its inflation, there is provided a device 148 for locking the piston 146 of the actuator 142 which appears in more detail in FIG. 5. This locking device 148 includes a through opening 150 sealingly closed by sealing elements 152 cooperating with a lock 154 in the form of a piston. The lock 154 is slidable between a locked position in which it occupies the whole of the opening 150 and projects from either side of piston 146 between the elements 152 (position 154a) and an unlocked position (as shown) in which the piston 146 can freely slide and axially stretch the balloon 130.

The unlocking of the lock 154 is obtained by supplying compressed air through the conduit 155. The travel of the lock 154 is limited by shock absorbing means 156 cooperating with the stop 158, as clearly seen in FIG. 5.

Referring to FIG. 6 showing the puller or pusher displacing element 4, the latter is constituted, in the example illustrated, by a fluid-operated double-acting actuator 160 including a body or casing 162 connected to part of the coupled elements by the previously described system of sleeves 164 press-fitted onto the linking cable 16, at least one of the said coupled elements being a holding element (the holding element 6 in the case considered), and a piston 166 connected to the remaining part of coupled elements at least one of which is a holding element (the holding element 2 in the case considered) (FIG. 1).

Preferably, this actuator is a pneumatic actuator and there are shown at 168 and 170 the compressed air supply conduits. However, this actuator may also be a hydraulic actuator.

According to a preferred feature of this form of embodiment of the puller or pusher displacing element 4, the latter is provided with a rotation-preventing system 172 consisting of a guide bar 174 secured at 176 to the actuator body 162, the said guiding rod being parallel and outwardly shifted with respect to the piston 166 of the actuator and being provided near its free end with an element 178 connecting the actuator piston 166 with the guide bar 174 and allowing the free sliding of the piston 166.

Lastly and referring to FIG. 1, it is seen that the operating element 8 preferably is the last element and includes means 200, 202, 204 for independently actuating each other element. The said means 200, 202, 204 for independently actuating each other element are preferably provided for receiving actuating commands transmitted through an electric cable 210 connected to a control station (not shown), preferably located outside duct 1. According to the form of embodiment illustrated, where the means 200, 202, 204 are electrically controlled means of distribution of compressed air to each element 6, 4, 2, respectively, there is provided a safe operation device 206 consisting of a pressostat or pressure controller connected in parallel with the means 200, 202, 204 and which actuates an electric relay when the required air pressure is reached. This electric relay "gives the green light" to the control station which, in its turn, transmits the adequate actuating command through the electric cable 210.

It will be noted that in the example illustrated in FIG. 1, the actuating means 204 is not placed on the operating element 8 but on the displacing element 4 in order to distribute compressed air near the holding element 2. However, it may be placed on the holding element 2 or even on the operating element 8.

Preferably, the electric cable 210 is arranged within the main compressed-air supply conduit 212. The upstream and downstream connecting system is shown in more detail in FIG. 9. This connecting system includes a rod 220 which, in the case considered, is connected to the operating element 8 to which is connected a sheath 222 containing the end of the compressed-air supply conduit 212 within which the electric cable 210 is passed. The compressed-air supply conduit 212 is a conduit of low-friction (easy-sliding) plastic material, e.g. high-density polyethylene, ending with a connecter 224 to which is welded a hollow part with several outlets (three in number in the case considered) 226, 228, 230 for the supply of the actuating means 200, 202, 204. Following the welded part 226 are the section-reducing parts 232, 234 ending with a stuffing box 236 provided with an orifice for the passage of the electric cable 210. The compressed-air supply conduit 212 is advantageously protected and reinforced by means of sleeves 240, e.g. of high-density polyethylene.

It is thus understood that during the displacement of the apparatus of the invention, the latter pulls the compressed-air supply conduit 212 and simultaneously the electric cable 210 from the exterior of the duct 1. The supply conduit 212 is advantageously wound on a reel or the like in common use for plastics tubes of great lengths, mounted on a shaft and supports specially equipped on one side with an electrical collector and on the other side with a rotary joint for the supply of compressed-air. Within the reel is advantageously provided a support for the control and programming box. One of the side-plates of the reel is provided with equally spaced holes which serve, owing to a device for detecting the stoppage of the rotation of the reel, such as for example a photoelectric cell, to stop the electric power supply since the stoppage of the reel follows upon the stoppage of the displacement of the apparatus of the invention resulting from the presence of an impassable obstacle in the interior of the duct 1.

The operation of the apparatus of the invention according to the form of embodiment illustrated in FIG. 1 is as follows:

a. The downstream holding element 6 is first caused to be held in position by unfolding the arms 12 by actuating the actuators 100 (FIG. 2) supplied with compressed-air by the actuating means 200.

b. The piston 166 of the displacing element 4 is caused to extend, thus causing the pushing of the upstream portion of the apparatus, i.e. in the case considered, of the upstream holding element 2, which is in the non-locked condition.

c. The upstream holding element 2 is thereafter caused to be held in position by the actuation of the holding means 10 by means of the actuating means 204.

d. Thereafter, the downstream holding element 6 is caused to be unlocked, thus causing the folding of the arms 12.

e. Thereafter, the piston 166 of the actuator 160 constituting the displacing element 4 is caused to retract, thus resulting in a pull on the body 162 of the actuator 160 and therefore in a pull on the downstream holding element 6, the operating element 8 and, consequently, on any trailed object or tube coupled to this set of elements. This pull also causes the unwinding of a portion of the supply pipe 212 containing the cable 210.

This sequence of operations is repeated indefinitely and is therefore easily programmable and automatizable. To this end, the control station includes means for automatic control of the various elements of the apparatus.

It can also be observed that, during each sequence, the apparatus is displaced over a distance corresponding to the pushing length of the piston 166 with respect to the body 162 of the actuator 160. Furthermore, to ensure the correct operation of the apparatus, one holding element (the holding element 2 or the holding element 6 in the case considered) is permanently in the holding condition.

It is also seen that the tractive force depends on the characteristics of the actuator 160. This tractive force can therefore be modified by modifying the characteristics of the actuator, which is easy to achieve since the elements are independent of one another and connected together interchangeably.

The tractive force of the apparatus of the invention can also be considerably increased e.g. by adding to the elements shown in FIG. 1 complementary elements represented in FIG. 10.

Thus, referring to FIG. 10, the apparatus of the invention includes, following the operating element 8 of FIG. 1, an independent element 300 constituting a complementary displacing element, preferably consisting of a hydraulically-operated actuator 302, which advantageously is a double-acting actuator by being provided with a double hydraulic fluid supply on either side of the piston 304 of the actuator 302 by means of supply conduits conventionally shown at 306 and 308. Of course, the piston 304 of the actuator 302 is connected to the cable 16 connecting the element 300 to the preceding element 8, whereas the body 310 of the actuator 302 is connected to the linking cable 16 of the means 14 of articulation with the following element or of junction to a centering means 22 located at the end of the apparatus. Preferably, and as illustrated, following the complementary displacing element 300 preferably constituted by a hydraulic actuator, there is another independent element 320 which is a pressure multiplying element with, preferably and as shown, a pneumatic-hydraulic interface so as to provide a considerable pushing force of the piston 304 of the actuator 302 constituting the complementary displacing element 300. Thus, this pressure multiplying element 320 includes a body or casing 322 divided into two sections 324, 326 by a transverse partition 328 provided with a central orifice 330 through which extends the rod 332 of a piston 334. The section 326 is supplied with hydraulic fluid through the supply conduit 336 preferably from a hydraulic fluid tank 338 constituting still another independent element following the pressure multiplying element 320. The section 326 is also provided with a hydraulic fluid outlet conduit 340 connected to still another complementary element 350 for supporting a hydraulic distributing device 352 with electrical control means 354 through the electric cable 210. The conduit 340 is alternately connected to the hydraulic fluid supply conduit 306 for the first action of the actuator 302 or to the element constituting the hydraulic tank 338. Likewise, the conduit 308 for the second action of the actuator 302 leads to the hydraulic distributing system 350 so as to form a closed circuit with the element constituted by the hydraulic tank 338. Of course, one-way valves such as 356, 358 may be mounted on various conduits. Thus, the hydraulic distributing system 350 actually forms part of a complementary operating element 360 which advantageously includes a compressed-air distributing system 362 to supply with compressed-air through a conduit 364 connected to the conduit 212 and transmitting compressed air to the section 324 of the pressure multiplying element behind the piston 334. The piston 334 is provided with return means 366 such as a spring. The device 362 also includes electrical control means 368.

With this sequence of complementary elements in combination with the previously described elements appearing in FIG. 1, there is obtained a self-displacing apparatus with a very high tractive force of at least 3 tons and a displacement distance which may reach and even exceed 2 kilometers, which amply exceeds the needs of all the possible applications of this type of apparatus.

In this case, the apparatus operates as follows:

a. The upstream holding element 2 is first caused to be held in position;

b. The holding element 6 is thereafter unlocked;

c. Thereafter, the hydraulically operated piston 304 of the complementary displacing element 300 is caused to extend and, simultaneously, the piston 166 of the operating element 4, which in this case is operated pneumatically, is caused to retract;

d. Thereafter, the downstream holding element 6 is caused to be held in position;

e. Thereafter, the hydraulically operated piston 304 of the complementary displacing element 300 is caused to retract, thus exerting a pull on the rear portion of the apparatus;

f. The upstream holding element 2 is then unlocked;

g. The pneumatically-operated piston 166 of the displacing element 4 is caused to extend, thus resulting in a pushing action on the portion of the apparatus which is located downstream of the holding element 6.

This sequence of operations is repeated indefinitely by starting, therefore, with the locking in position of the upstream holding element 2. Thus, the control station includes programmed means for automatic control of the various elements of the apparatus.

It is therefore understood that the operation of the apparatus of the invention easily lends itself to programming and therefore to complete automation, thus rendering the apparatus completely independent and allowing work by night or during the weekend.

Furthermore, as mentioned earlier, there are obtained, with the apparatus of the invention, very important tractive forces over long distances, while at the same time the apparatus is easily miniaturizable and can be displaced over very important distances. Furthermore, as already pointed out, it can be easily displaced in the interior of highly polluted or soiled ducts containing solid extraneous matter such as viscous or sticky deposits, such as for example tar deposits, which may cause additional friction reaching at least 500 kilogrammes, which is quite remarkable and constitutes an altogether unexpected result for anyone conversant with the art. Moreover, the apparatus of the invention is capable of taking curves.

It should be noted that a further important advantage of the apparatus of the invention results from the fact that the holding elements brace themselves against the internal wall 1a of the duct 1. There is thus obtained an adaptation of the bearing and therefore reactive force on the wall of the duct 1 depending on the tractive force.

Furthermore, the apparatus of the invention can in no case rotate or overturn in the duct, owing, particularly, to the presence of the rotation-preventing device at all points capable of rotating, e.g. on the displacing element 4 (anti-rotatory device 172) or on the supply connector of FIG. 9 (anti-rotatory device 242), etc.

Of course, the invention includes all means constituting technical equivalents to the means described as well as their various combinations.

What is claimed is:

1. An apparatus with self-displacement means for its advance in the interior of a duct notably for remote inspection or treatment of the duct, comprising a plurality of elements coupled to one another so as to make up a train, each element of which constitutes a wagon independent of the other elements and being interchangeable at will, each said element performing a definite function and being of a length adapted for any curves to be taken, at least one of said elements constituting a displacing element, at least one other of said elements constituting an operating element for operating said displacing element, said elements being coupled to one another by flexible linking means, said flexible linking means being provided with sliding and centering bearing means so that the apparatus is adapted to pass any curve.

2. The apparatus of claim 1 wherein said displacing element is an element for displacement by pulling or pushing, referred to as a puller-pusher element.

3. The apparatus of claim 2, wherein the puller or pusher element is provided with anti-rotatory means.

4. The apparatus of claim 1 wherein at least one element is a holding element including holding means selectively bearing on the internal wall of said duct so as to resist tractive efforts.

5. The apparatus of claim 4 wherein at least one of the holding elements comprises a body provided at its periphery with several rigid arms which advantageously are adjustable in length, independently movable, pivoted at one end and provided with holding shoes at their free opposite ends, so as to be displaceable between a folded or rest position substantially parallel to the body of the holding elements and an unfolded or holding position in which the holding shoes bear on the internal wall of the duct.

6. The apparatus according to claim 5, wherein said holding element includes rigid actuators for rotating the arms in a plane perpendicular to the axis of the duct.

7. The apparatus of claim 4, wherein at least one of said holding elements includes a body provided at its periphery with a plurality of independent flexible actuators radially projecting towards the internal wall of the duct and having a free end provided with holding means.

8. The apparatus of claim 4, wherein at least one of said holding elements comprises an inflatable balloon which, in the deflated condition, is of an outer diameter smaller than the diameter of the duct, and which, in the inflated condition, directly engages the internal wall of the duct.

9. The apparatus of claim 8, wherein said inflatable balloon is internally provided with a rigid actuator for stretching the balloon, the body of which is secured to either one of two opposing front and rear wall portions of said balloon, said actuator comprising a piston connected to the other one of said two opposing wall portions of the balloon, so as to axially stretch the balloon thus reducing its diameter.

10. The apparatus of claim 1 wherein said displacing element is arranged between an upstream holding element and a downstream holding element alternately actuated by the operating element.

11. The apparatus of claim 1 wherein said displacing element is constituted by an actuator including a body connected to a part of the coupled elements at least one of which is a holding element, and an actuator piston connected to the remaining part of the coupled elements, at least one of which is a holding element.

12. An apparatus with self-displacement means for its advance in the interior of a duct, notably for remote inspection or treatment of the duct, comprising a plurality of elements coupled to one another so as to make up a train, each element of which constitutes a wagon independent of the other elements and being interchangeable at will, each said element performing a definite function and being of a length adapted for any curves to be taken, at least one of said elements constituting a displacing element, at least one other of said elements constituting an operating element for operating said displacing element, said elements being coupled to one another by cable means, said cable means having free ends provided with sleeves press-fitted on said free ends, said sleeves being inserted into sockets provided in the elements to be assembled.

13. An apparatus with self-displacement means for its advance in the interior of a duct, notably for remote inspection or treatment of the duct, comprising a plurality of elements coupled to one another so as to make up a train, each element of which constitutes a wagon independent of the other elements and being interchangeable at will, each said element performing a definite function and being of a length adapted for any curve to be taken, at least one of said elements constituting a displacing element, at least one other of said elements constituting an operating element for operating said displacing element, said elements being coupled to one another by cable means provided with sliding and centering bearing means including cup-shaped members clamped between two separable side-plates, said cup-shaped members being provided with recesses to allow the passage of unfixed extraneous matter.

14. The apparatus of claim 13, comprising an independent complementary displacing element constituted by a hydraulically-operated actuator mounted downstream of the preceding elements and of the preceding displacing element.

15. The apparatus according to claim 14, comprising a pressure multiplying element following the complementary displacing element, and said pressure multiplying element being followed by an element constituting a hydraulic tank, an operating element being provided for the said complementary elements.

16. An apparatus with self-displacement means for its advance in the interior of a duct, notably for remote inspection or treatment of the duct, comprising a plurality of elements coupled to one another so as to make up a train, each element of which constitutes a wagon independent of the other elements and being interchangeable at will, each said element performing a definite function and being of a length adapted for any curves to be taken, at least one of said elements constituting a displacing element, at least one other of said elements constituting an operating element for operating each said displacing element, said elements being coupled to one another by cable means provided with sliding and centering bearing means comprising substantially tubular sledge members.

17. An apparatus with self-displacement means for its advance in the interior of a duct notably for remote inspection or treatment of the duct, comprising a plurality of elements coupled to one another so as to make up a train, each element of which constitutes a wagon independent of the other elements and being interchangeable at will, each said element performing a definite function and being of a length adapted for any curves to be taken, at least one of said elements constituting a displacing element, at least one other of said elements constituting an operating element for operating said displacing element, each operating element is the last of each series of elements which it operates and includes actuating means of each other element which it operates, said actuating means receiving actuating signals transmitted by an electric cable connected to a control station located outside the duct, said elements being coupled to one another by flexible linking means provided with sliding and centering bearing means, so that the apparatus can pass any curve.

18. The apparatus of claim 17, wherein at least some of said elements are pneumatically-operated elements and said electric cable is placed within a compressed air conduit feeding the said pneumatically-operated elements.

19. The apparatus of claim 17, wherein said control station comprises programmed means for automatic control of the various elements constituting the apparatus.

20. An apparatus with self-displacement means for its advance in the interior of a duct, notably for remote inspection or treatment of the duct, comprising a plurality of elements coupled to one another so as to make up a train, each element of which constitutes a wagon independent of the other elements and being interchangeable at will, each said element performing a definite function and being of a length adapted for any curves to be taken, at least one of said elements constituting a displacing element, at least two of said elements constituting respectively a first holding element and a second holding element, each holding element including holding means selectively bearing on the internal wall of said duct, said displacing element being arranged between said first holding element and said second holding element, at least one other of said elements constituting an operating element for operating said displacing element and actuating alternately said first holding element and said second holding element, said elements being coupled to one another by flexible cable-type means, said flexible cable-type means being provided with sliding and centering bearing means, thereby forming a self-displaceable apparatus able to pass any curve.

21. The apparatus of claim 20, wherein said flexible cable-type means have free ends provided with sleeves press-fitted on said free ends and inserted into sockets provided in the elements to be assembled, said sliding and centering bearing means include cup-shaped members clamped between two separate side-plates, and said cup-shaped members are provided with recesses to allow the passage of unfixed extraneous matter.

22. The apparatus of claim 20, wherein said first holding element and said second holding element each comprises an inflatable balloon which, in deflated condition, is of an outer diameter smaller than the diameter of the duct, and which, in inflated condition directly engages the internal wall of the duct, and said operating element is arranged downstream with respect to said holding elements and said displacing element.

23. The apparatus of claim 20, wherein said first holding element and said second holding element each comprises a body provided at its periphery with a plurality of independent flexible actuators radially projecting towards the internal wall of the duct and having a free end provided with holding means, and said operating element is arranged downstream with respect to said holding elements and said displacing element.

24. An apparatus with self-displacement means for its advance in the interior of a duct, notably for remote inspection or treatment of the duct, comprising a plurality of elements coupled to one another so as to make up a train, each element of which constitutes a wagon independent of the other elements and being interchangeable at will, each said element performing a definite function and being of a length adapted for any curves to be taken, at least one of said elements constituting a displacing element, at least two of said elements constituting respectively a first holding element and a second holding element, each holding element including holding means selectively bearing on the internal wall of said duct, at least one other of said elements constituting an operating element for operating said displacing element and actuating alternately said first holding element and said second holding element, said displacing element being located between said first holding element and said second holding element, said operating element being arranged downstream with respect to said holding elements and said displacing element, at least one of said remaining elements constituting an independent complementary displacing element constituted by an hydraulically operated actuator mounted downstream of the preceding elements, said complementary displacing element being followed downstream by a complementary operating element operating said complementary displacing element, said elements being coupled to one another by flexible linking means, thereby forming a self-displaceable apparatus able to pass any curve.

25. An apparatus with self-displacement means for its advance in the interior of a duct, notably for remote inspection or treatment of the duct, comprising a plurality of elements coupled to one another so as to make up a train, each element of which constitutes a wagon independent of the other elements and being interchangeable at will, each said element performing a definite function and being of a length adapted for any curves to be taken, at least one of said elements constituting a displacing element, at least two of said elements constituting respectively a first holding element and a second holding element, each holding element including holding means selectively bearing on the internal wall of the duct, at least one other of said elements constituting an operating element for operating said displacing element and actuating alternately said first holding element and said second holding element, said displacing element being located between said first holding element and said second holding element, said operating element is arranged downstream with respect to said holding elements and said displacing element, at least one of said remaining elements constituting an independent complementary displacing element constituted by a hydraulically operated actuator mounted downstream of the preceding elements, said complementary displacing element being followed downstream by a complementary operating element operating said complementary displacing element, a pressure-multiplying element following the complementary displacing element, said pressure-multiplying element being followed by an element constituting a hydraulic tank, said complementary operating element also operating said pressure-multiplying element with hydraulic fluid taken from said hydraulic tank, said elements being coupled to one another by flexible linking means, thereby forming a self-placeable apparatus able to pass any curve.

26. The apparatus of claim 25, wherein said flexible linking means are provided with sliding and centering bearing means comprising substantially tubular sledge members.

27. The apparatus of claim 25, wherein said flexible linking means are provided with sliding and centering bearing means including cup-shaped members clamped between two separate side-plates, said cup-shaped members being provided with recesses to allow the passage of unfixed extraneous matter.

* * * * *